(12) United States Patent
Su

(10) Patent No.: US 9,829,022 B2
(45) Date of Patent: Nov. 28, 2017

(54) UNIVERSAL JOINT SYSTEM

(71) Applicant: Blandon E Su, Buffalo Grove, IL (US)

(72) Inventor: Blandon E Su, Buffalo Grove, IL (US)

(*) Notice: Subject to any disclaimer, the term of this patent is extended or adjusted under 35 U.S.C. 154(b) by 260 days.

(21) Appl. No.: 14/816,040

(22) Filed: Aug. 2, 2015

(65) Prior Publication Data
US 2017/0030390 A1    Feb. 2, 2017

(51) Int. Cl.
*F16B 7/04* (2006.01)
*F16D 1/00* (2006.01)
*F16D 3/00* (2006.01)
*F16B 7/22* (2006.01)

(52) U.S. Cl.
CPC .......... *F16B 7/0413* (2013.01); *F16B 7/0446* (2013.01); *F16B 7/22* (2013.01); *Y10T 403/44* (2015.01)

(58) Field of Classification Search
CPC .. F16B 7/04; F16B 7/13; F16B 7/0446; F16B 7/22; A63H 33/06; A63H 33/062; A63H 33/08; A63H 33/088; Y10T 403/342; Y10T 403/347; Y10T 403/44
USPC .......................... 403/216–219; 446/124, 128
See application file for complete search history.

(56) References Cited

U.S. PATENT DOCUMENTS

| | | | | |
|---|---|---|---|---|
| 1,894,605 A * | 1/1933 | Wright | ................... | A63H 33/04 446/122 |
| 3,813,841 A * | 6/1974 | Tsurumi | ................... | F16S 5/00 273/146 |
| 4,676,762 A * | 6/1987 | Ballard | ................. | A63H 33/084 446/104 |
| 5,098,328 A * | 3/1992 | Beerens | ............... | A63H 33/086 446/125 |
| 5,645,464 A * | 7/1997 | Chen | ...................... | A63H 33/10 403/300 |
| 5,664,387 A * | 9/1997 | Bhatti | .................. | A63H 33/088 446/102 |
| 5,826,873 A * | 10/1998 | Lavermicocca | .......... | A63F 9/12 273/157 R |
| 5,928,052 A * | 7/1999 | Buscher | ................. | A63H 33/10 446/118 |
| 6,086,444 A * | 7/2000 | Glickman | ............... | A63H 33/08 446/120 |
| 6,241,248 B1 * | 6/2001 | Winter | ...................... | A63F 9/12 273/153 S |
| 6,250,986 B1 * | 6/2001 | Sorensen | ............. | A63H 33/062 446/121 |
| 6,679,780 B1 * | 1/2004 | Shih | ...................... | A63F 9/1204 273/156 |
| D506,790 S * | 6/2005 | Gee | .............................. | D21/479 |
| 7,988,517 B2 * | 8/2011 | Bishop | ................. | A63H 33/082 446/108 |
| 8,540,545 B2 * | 9/2013 | Leicht | .................. | A63H 33/106 446/118 |

(Continued)

*Primary Examiner* — Abigail Troy
*Assistant Examiner* — Nahid Amiri

(57) ABSTRACT

A universal joint system is provided for joining tubular members to form two-dimensional or three-dimensional shapes or structures. The system includes a plurality of cubic elements, a plurality of adaptor elements, a plurality of connection elements, and a plurality of insertion elements. Structures or shapes built with the system can have a smooth and continuous appearance. In addition, the construction of varies structures or shapes requires only few kinds of elements and no special tool or training is needed.

3 Claims, 4 Drawing Sheets

(56) References Cited

U.S. PATENT DOCUMENTS

| | | | | |
|---|---|---|---|---|
| 8,628,374 B2* | 1/2014 | McDonald | ........... | A63H 33/042 |
| | | | | 446/128 |
| 8,715,029 B2* | 5/2014 | Bishop | ................ | A63H 33/084 |
| | | | | 446/108 |
| 2014/0051321 A1* | 2/2014 | Kelly | ..................... | G09F 19/00 |
| | | | | 446/128 |
| 2015/0314211 A1* | 11/2015 | Lama | .................. | A63H 33/086 |
| | | | | 446/97 |
| 2015/0336018 A1* | 11/2015 | Chin | ........................ | E04C 1/00 |
| | | | | 446/124 |

* cited by examiner

# UNIVERSAL JOINT SYSTEM

BACKGROUND OF THE INVENTION

The present invention relates to a universal joint system and, more particularly, a universal joint system for joining hollow tubular members to form two-dimensional or three-dimensional shapes or structures.

There are known joint systems for joining tubular members to form two-dimensional or three-dimensional shapes or structure. However, such joint systems are generally geometrically specific and not symmetrical in all the directions of connection. As a result, such systems require many different parts in order to accommodate various connection situations. In addition, such joint systems typically do not produce continuous and smooth appearances. Consequently, such joint systems are expensive, inconvenient, and not attractive. Therefore, there is a need to provide a novel joint system that is convenient, symmetrical in all directions of connection, and can produce shapes or structures with continuous and smooth appearances.

SUMMARY OF THE INVENTION

The primary object of the present invention is to provide a convenient universal joint system including a plurality of cubic elements, a plurality of adaptor elements, a plurality of connection elements, and a plurality of insertion elements. The cubic element can connect multiple hollow tubular members with connection elements and adaptor elements to form a variety of two-dimensional or three-dimensional shapes or structures.

The secondary object of the present invention is to provide a universal joint system that has a smooth and continuous appearance when connecting tubular members.

In order to achieve the above objects, the universal joint system of the present invention mainly includes a plurality of cubic elements, a plurality of adaptor elements, a plurality of connection elements, and a plurality of insertion elements.

The cubic element each is provided at all six sides with a centrally located connection slot which extends the full side length of the cubic element and has at least two protruding mating pins sized to be fitted with the holes in the connection elements and the insertion elements. The length of the mating pin is slightly less than the depth of the connection slot. The connection slots of the cubic element are oriented in an orthogonal and alternating manner so that no two connection slots meet at the edges of the cubic element.

The adaptor element each has two portions. One portion has the mirrored geometry of half of a cubic element; another portion is a projecting stud sized to be tight fitted with one end of a tubular member.

The connection element each is provided with at least two mating holes on one side with the same spacing as the mating pings in the connection slot of a cubic element. The width of the connection element is sized to be fitted with the width of the connection slot, while the thickness of the connection element is approximately the same as the depth of the connection slot. The matting holes are sized to provide medium to tight fitting with the matting pins when the connection element is inserted into the connection slot of a cubic element or an adaptor element.

The insertion element each is provided with at least one mating open hole at both sides of the insertion element. The width of the insertion element is sized to be fitted with the width of the connection slot, while the thickness is approximately twice the depth of the connection slot. The matting hole is sized to provide medium to tight fitting with the matting pins when the insertion element is inserted into the connection slot of a cubic element or an adaptor element.

Further features and advantages of the universal joint system will become apparent with reference to the following drawings, descriptions, and claims.

BRIEF DESCRIPTION OF THE DRAWINGS

The universal joint system in accordance with the invention is described as follows in detail, by way of example, with reference to the accompanying diagrammatic drawings, in which.

DETAILED DESCRIPTION OF THE INVENTION

Figure 1:
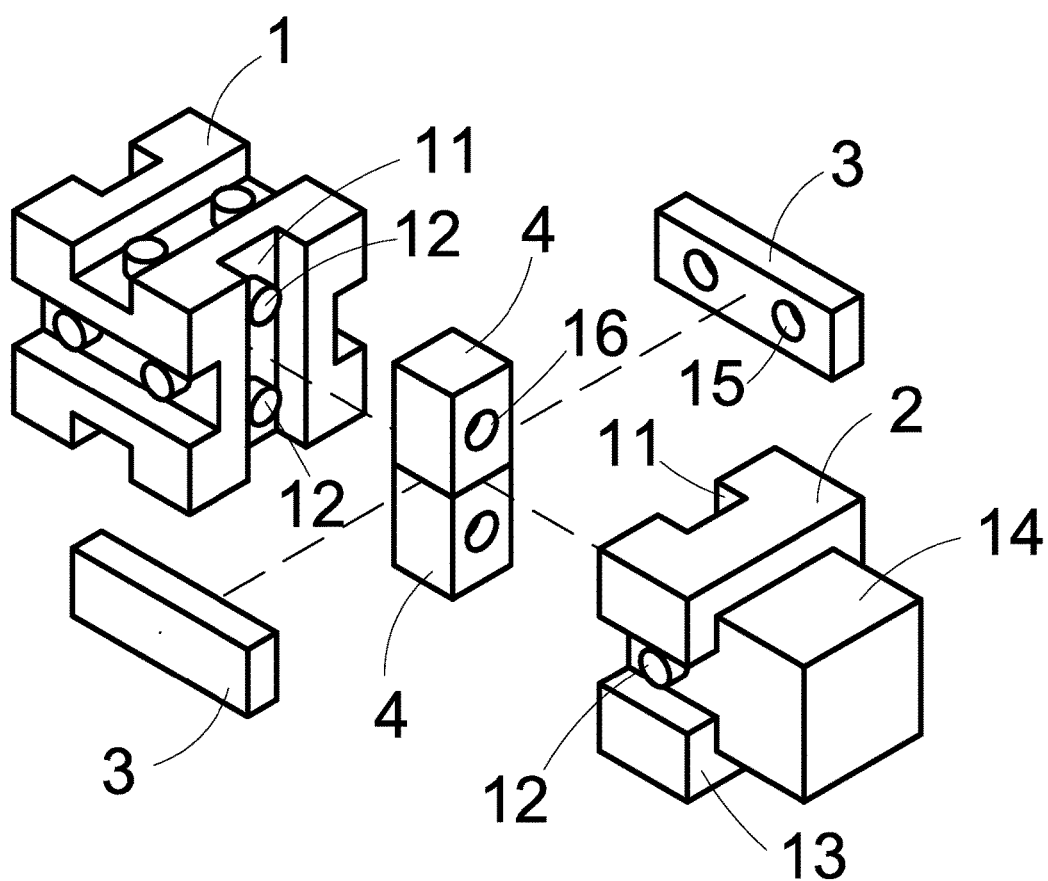
FIG. 1 is a perspective view exemplifying an embodiment according to the present invention.

Refer to FIG. 1, the universal joint system of the present invention mainly include a plurality of cubic elements 1, a plurality of adaptor elements 2, a plurality of connection elements 3, and a plurality of insertion elements 4.

Figure 2:
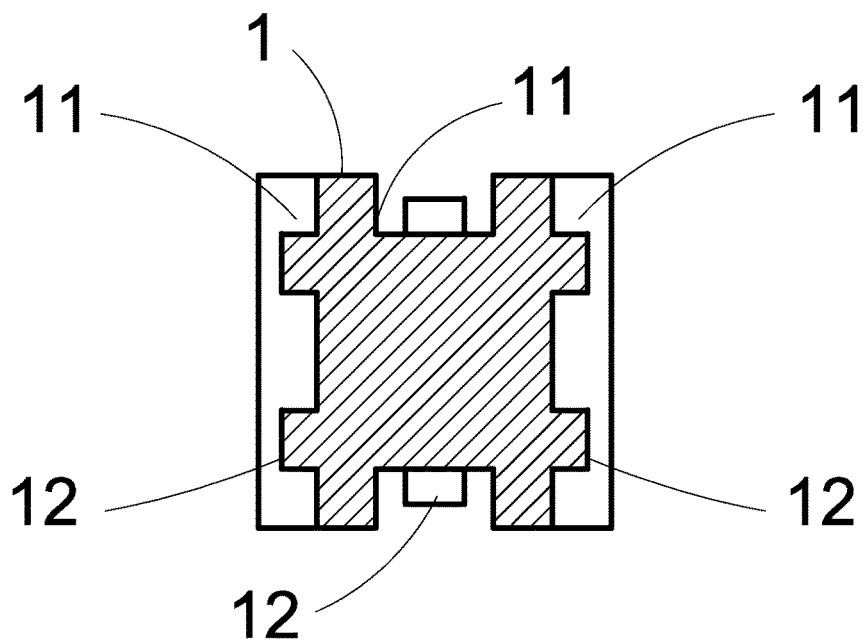
FIG. 2 is a section view exemplifying an embodiment of the cubic element according to the present invention.

Refer to FIG. 1 and FIG. 2, the cubic element 1 is provided at all six sides with a centrally located connection slot 11 which extends the full side length of the cubic element 1 and has at least two mating pins 12, preferably round in cross section, protruding from the base of the connection slot 11 and sized to be fitted with the mating holes 15 of the connection element 3 or the mating holes 16 of the insertion element 4. The length of the mating pin 12 is slightly less than the depth of the connection slot 11. The connection slots 11 of the cubic element 1 are oriented in an orthogonal and alternating manner so that no two connection slots meet at the edges of the cubic element.

Figure 3:
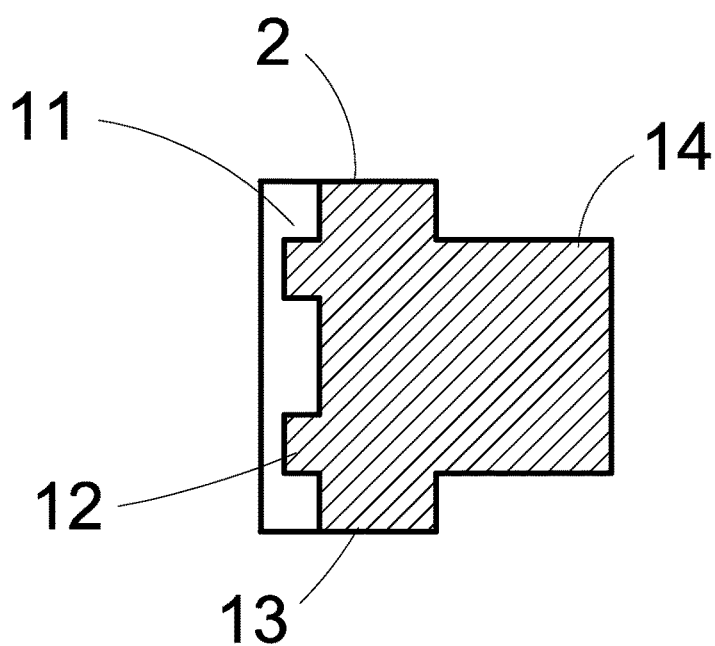
FIG. 3 is a section view exemplifying an embodiment of the adaptor element according to the present invention.

Refer to FIG. 1 and FIG. 3, the adaptor element 2 each has two portions. The adapting portion 13 has the mirrored geometry as half of a cubic element; the stud portion 14 has a projecting stud sized to be tight fitted with one end of a typical hollow tubular member. The cross section of the stud portion 14 can be round, triangular, square, or polygonal to fit various type of tubular members.

Figure 4:
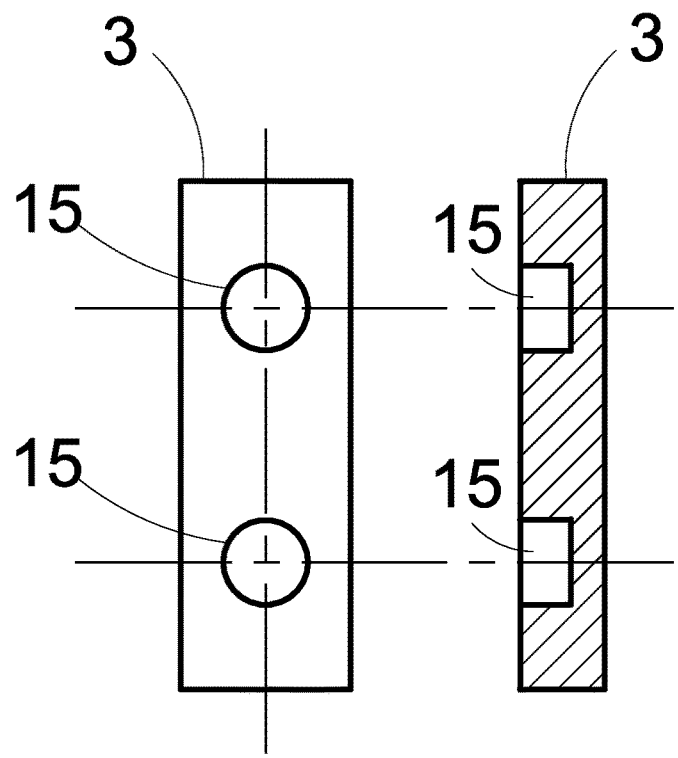
FIG. 4 shows the front and section views exemplifying an embodiment of the connection element according to the present invention.

Refer to FIG. 1 and FIG. 4, the connection element 3 is provided with at least two mating holes 15 on one side with the same spacing as the mating pings 12 in the connection slot 11 of a cubic element 1. The width of the connection element 3 is sized to be fitted with the width of the connection slot 11, while the thickness of the connection element 3 is approximately the same as the depth of the connection slot 11. The matting holes 15 are sized to provide medium to tight fitting with the matting pins 12 when the connection element 3 is inserted into the connection slot 11 of a cubic element 1 or an adaptor element 2. The depth of the mating hole 15 is slightly greater than the length of the mating pin 12. The connection element 3 can also extend in length to have three or more mating holes 15 with spacing identical to the mating pins 12. The function of the connection element 3 is to provide solid connection between the cubic element 1 and adapter element 2, and maintain a smooth and continuous appearance.

Figure 5:
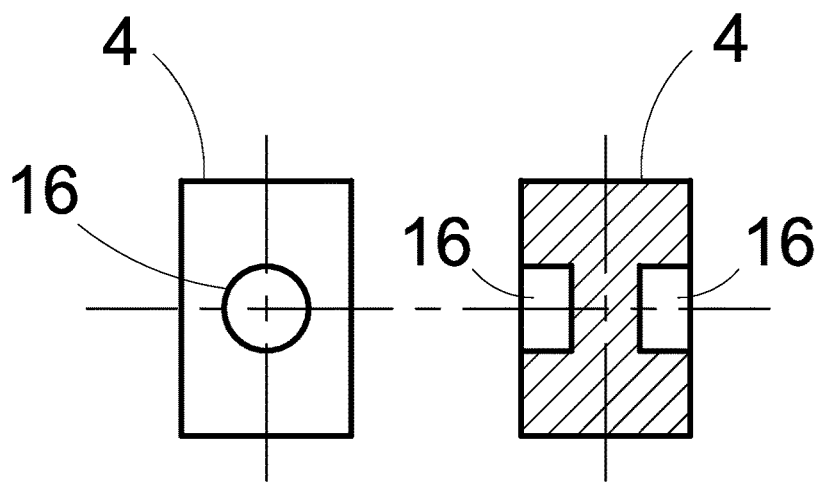
FIG. 5 shows the front and section views exemplifying an embodiment of the insertion element according to the present invention.

Refer to FIG. 1 and FIG. 5, the insertion element 4 is provided with at least one mating hole 16 on both side of the insertion element 4. The width of the insertion element 4 is sized to be fitted with the width of the connection slot 11, while the thickness the insertion element 4 is approximately twice the depth of the connection slot 11. The matting hole 16 is sized to provide medium to tight fitting with the matting pins 12 when the insertion element is inserted into the connection slot of a cubic element 1 or an adaptor element 2. The depth of the mating hole 16 is slightly greater than the length of the mating pin 12. The insertion element 4 can also extend in length to have two or more mating holes 16 on both sides with spacing identical to the mating pins 12. The function of the insertion element 4 is to fill the void space between the cubic element 1 and adapter element 2, and maintain a smooth and continuous appearance.

Figure 6:
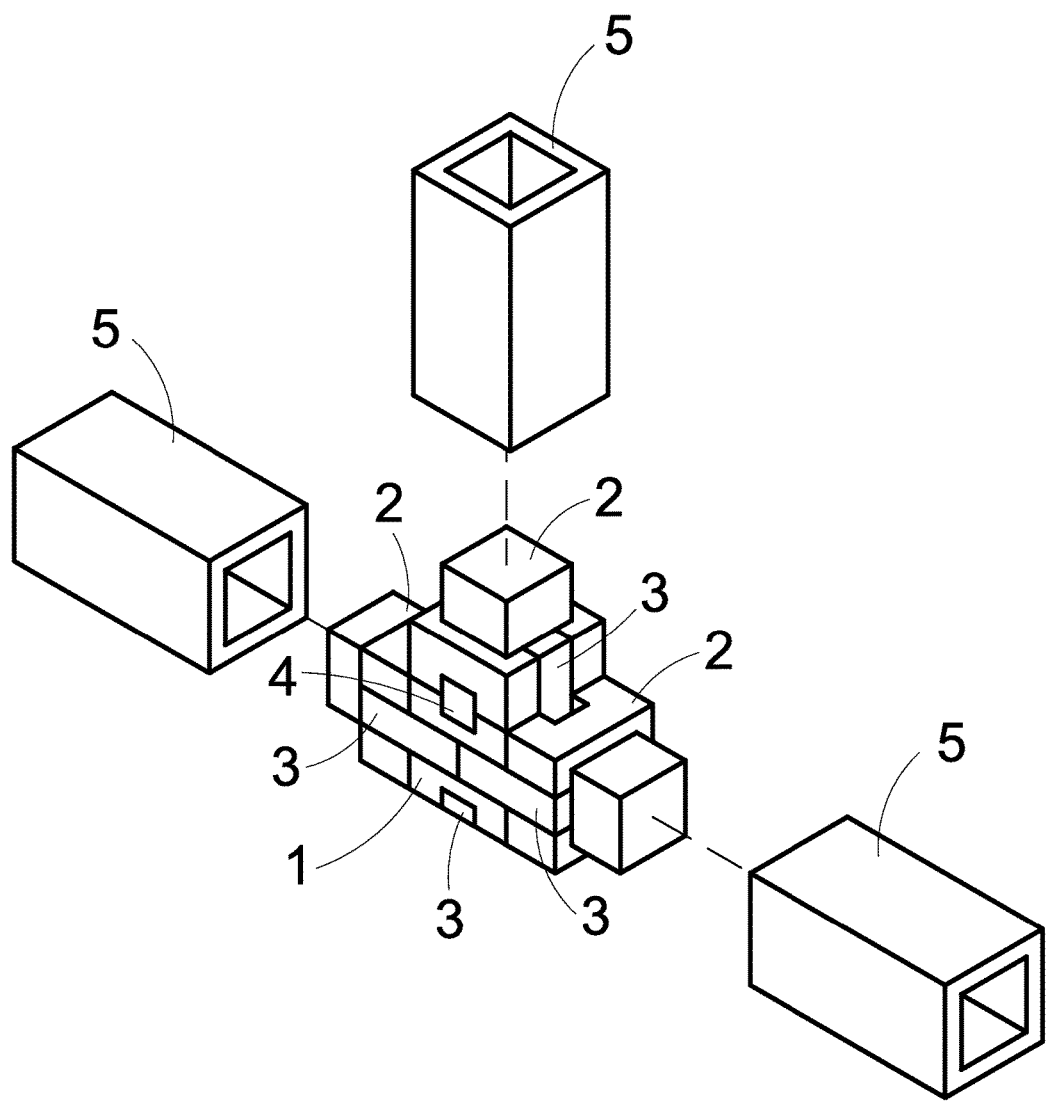
FIG. 6 exemplifies the use of an embodiment according to the present invention with typical hollow tubular members.

In use, refer to FIG. 6, typical hollow tubular members 5 are connected to the cubic member 1 through adapter members 2, connection member 3, and insertion members 4. Furthermore, adhesives, nails, screws, pins, or the similar can be applied with the present invention for constructing stronger and more permanent shapes or structures.

In summary, the present invention has the following advantages:
1. A variety of two-dimensional or three-dimensional shapes or structures can be created conveniently from few kinds of elements.
2. The mechanism of connection is orthogonal and symmetrical. Thus it is easier to use and more interesting.
3. A smooth and continuous appearance can be created at the joint when connecting tubular members.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

What is claimed is:

1. A universal joint system comprising a plurality of cubic elements, a plurality of adaptor elements, a plurality of connection elements, and a plurality of insertion elements;
   each cubic element being provided at all six sides with a centrally located, parallel to opposing side edges of each side, connection slot which has at least two protruding mating pins, said mating pins each having a length slightly less than the depth of the said connection slot, said mating pins being arranged in a manner that when connected to said adaptor elements the spacing between mating pins remains consistent, said connection slots of the cubic element extending the full length at said all six sides of said cubic element and being oriented in an orthogonal and alternating manner such that no two connection slots meet at the edges of the cubic element;
   each adapter element having one portion with a mirrored geometry of half of said cubic element and another portion with a projecting stud, round or polygonal in cross section, sized to be tight fitted with one end of a hollow tubular member;
   each connection element being provided with at least two mating holes on one side with the same spacing as said mating pings in said connection slots of said cubic elements, the width of said connection element being sized to be fitted with the width of said connection slot, the thickness of said connection element being approximately the same as the depth of said connection slot, said matting holes being sized to provide medium to tight fitting with said matting pins when said connection element is inserted into the said connection slot of a said cubic element or a said adapter element; and
   each insertion element being provided with at least one mating holes on both sides, the width of said insertion element being sized to be fitted with the width of said connection slot, the thickness of said insertion element being approximately twice the depth of said connection slot, said matting holes being sized to provide medium to tight fitting with said matting pins when said insertion element is inserted into said connection slot of said cubic element or said adapter element;
   whereby when said universal joint system is used to connect hollow tubular members, a variety of two-dimensional and three-dimensional shapes or structures are created.

2. A universal joint system as claimed in claim 1, wherein said connection element has three or more said mating holes with the same spacing as said mating pings in said connection slots of said cubic elements.

3. A universal joint system as claimed in claim 1, wherein said insertion element has two or more said mating holes on both sides of said insertion element with the same spacing as said mating pings in said connection slots of said cubic elements.

* * * * *